(12) United States Patent
Yamada (10) Patent No.: US 8,605,335 B2
(45) Date of Patent: Dec. 10, 2013

(54) IMAGE PROCESSING DEVICE HAVING SCANNED-DOCUMENT DISTRIBUTED-TRANSMISSION CAPABILITY

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 974 days.

(21) Appl. No.: 12/488,428

(22) Filed: Jun. 19, 2009

(65) Prior Publication Data

US 2010/0002271 A1 Jan. 7, 2010

(30) Foreign Application Priority Data

Jul. 3, 2008 (JP) ................................. 2008-174631

(51) Int. Cl.
*H04N 1/40* (2006.01)
(52) U.S. Cl.
USPC ......................................................... 358/448
(58) Field of Classification Search
USPC ......................................................... 358/448
See application file for complete search history.

(56) References Cited

U.S. PATENT DOCUMENTS 5,051,779 A * 9/1991 Hikawa ............................ 399/84
6,426,806 B2 * 7/2002 Melen ........................... 358/468
6,799,717 B2 * 10/2004 Harris ............................ 235/375
7,023,974 B1 * 4/2006 Brannam et al. ............ 379/93.24
7,536,638 B2 * 5/2009 Barrus et al. .................. 715/233
7,873,200 B1 * 1/2011 Oakes et al. .................. 382/137

FOREIGN PATENT DOCUMENTS

| JP | 4-316270 | 11/1992 |
| JP | 2002-251352 | 9/2002 |
| JP | 2002-366468 | 12/2002 |
| JP | 2003-37724 | 2/2003 |
| JP | 2005/12625 | 1/2005 |
| JP | 2006-33405 | 2/2006 |
| JP | 2006-33406 | 2/2006 |

OTHER PUBLICATIONS

Japanese Official Action dated Apr. 27, 2010 with English language translation.

* cited by examiner

*Primary Examiner* — Marivelisse Santiago Cordero
*Assistant Examiner* — John Wallace
(74) *Attorney, Agent, or Firm* — Scully, Scott, Murphy & Presser PC (57) ABSTRACT

An image processing device, such as multifunction peripheral, includes a reading section, a judging section and a transmission section. The reading section reads an image on each of a plurality of objects and outputs a plurality of pieces of image data. Each piece of image data represents the image on each of the plurality of objects. The judging section judges whether each piece of image data meets a predetermined criterion. The transmission section transmits one or more pieces of image data that are judged by the judging section to meet the predetermined criterion to a predetermined destination set in relation with the criterion.

14 Claims, 8 Drawing Sheets

| NO | TYPE | DISCRIMINATING CONDITION | TRANSMISSION DESTINATION | TRANSMISSION METHOD | TRANSMISSION DATA | ADDITIONAL DATA | DATA EXTRACTION | EXTRACTING RANGE |
|---|---|---|---|---|---|---|---|---|
| 1 | FORM 1 | CHARACTER STRING (CONFERENCE, MINUTES, ···) | FILE SERVER | Scan-To-File | FILE | NONE | NONE | NONE |
| 2 | FORM 2 | CHARACTER STRING (FAX MESSAGE, FAX NO., DESTINATION NO, ···) | DESTINATION | FAX | FAX DATA | COVER PAGE | NONE | NONE |
| 3 | FORM 3 | SHAPE(SHAPE OF TABLE), CHARACTER STRING (REPORT, ···) | SUPERVISOR (xxx@xxxxx) | Scan-To-Email | ATTACHED FILE | EMAIL MESSAGE | NONE | NONE |
| 4 | PHOTO | IMAGE REGION PRESENT | FTP SERVER | Scan-To-FTP | FILE | NONE | VALID | IMAGE REGION |
| 5 | TEXT | ONLY TEXT REGION, AND NO CHARACTER STRINGS IN FORMS 1-3 AND NOT CONTAINED | INDIVISUAL (yyy@yyyyy) | Scan-To-Email | ATTACHED FILE | NONE | NONE | NONE |
| 6 | INDIVISUAL DATA | CHARACTER STRING (ADDRESS, NAME, PHONE NUMBER) | MANAGER (zzz@zzzzz) | Scan-To-Email | ATTACHED FILE | NONE | NONE | NONE |
| | UNKNOWN | NOTHING AVAILABLE | - | PRINT OR DISPOSAL | - | - | - | - |

| NO | TYPE | DISCRIMINATING CONDITION | TRANSMISSION DESTINATION | TRANSMISSION METHOD | TRANSMISSION DATA | ADDITIONAL DATA | DATA EXTRACTION | EXTRACTING RANGE |
|---|---|---|---|---|---|---|---|---|
| 1 | FORM 1 | CHARACTER STRING (CONFERENCE, MINUTES, ....) | FILE SERVER | Scan-To-File | FILE | NONE | NONE | NONE |
| 2 | FORM 2 | CHARACTER STRING (FAX MESSAGE, FAX NO., DESTINATION NO. ....) | DESTINATION | FAX | FAX DATA | COVER PAGE | NONE | NONE |
| 3 | FORM 3 | SHAPE(SHAPE OF TABLE), CHARACTER STRING (REPORT, ...) | SUPERVISOR (xxx@xxxxx) | Scan-To-Email | ATTACHED FILE | EMAIL MESSAGE | NONE | NONE |
| 4 | PHOTO | IMAGE REGION PRESENT | FTP SERVER | Scan-To-FTP | FILE | NONE | VALID | IMAGE REGION |
| 5 | TEXT | ONLY TEXT REGION, AND NO CHARACTER STRINGS IN FORMS 1-3 AND NOT CONTAINED | INDIVIDUAL (yyy@yyyyy) | Scan-To-Email | ATTACHED FILE | NONE | NONE | NONE |
| 6 | INDIVIDUAL DATA | CHARACTER STRING (ADDRESS, NAME, PHONE NUMBER) | MANAGER (zzz@zzzzz) | Scan-To-Email | ATTACHED FILE | NONE | NONE | NONE |
|  | UNKNOWN | NOTHING AVAILABLE | — | PRINT OR DISPOSAL | — | — | — | — |

FIG.3A

DISTRIBUTED TRANSMISSION SETTING — 51

DATA TYPE [FORM 1]

DISCRIMINATING CONDITION
- CONDITION #1 [CHARACTER STRING ▼] [CONFERENCE, MINUTES, ⋯]
- CONDITION #2 [ ▼] [ ]
- ⋮
- CONDITION #n [ ▼] [ ]
- CONDITION SETTING ⦿ AND  ○ OR

TRANSMISSION DESTINATION [FILE SERVER]
TYPE OF TRANSMISSION [Scan-To-File ▼] [DETAIL SETTING]
TRANSMISSION DATA [FILE ▼]
ADDITIONAL DATA ⦿  ○ NONE [DETAIL SETTING]

DATA EXTRACTION
⦿  ○ NONE
EXTRACTING RANGE [IMAGE DATA ▼] [DETAIL SETTING]

[APPLY] [OK] [CANCEL]

FIG.3B

TRANSMISSION METHOD DETAILED SETTINGS — 53

Scan-To-Email
- RESOLUTION [300dpi ▼]
- COMPRESSION TYPE [JPEG ▼]
- FILENAME [ATT????]
- ⋮

Scan-To-File
- RESOLUTION [600dpi ▼]
- COMPRESSION TYPE [TIFF ▼]
- FILENAME [FILE????]
- ⋮

FAX
- RESOLUTION [standard ▼]
- ⋮

Scan-To-File
- RESOLUTION [300dpi ▼]
- ⋮

[APPLY] [OK] [CANCEL]

IMAGE PROCESSING DEVICE HAVING SCANNED-DOCUMENT DISTRIBUTED-TRANSMISSION CAPABILITY

CROSS REFERENCE TO RELATED APPLICATION

This application claims priority from Japanese patent Application No. 2008-174631 filed Jul. 3, 2008. The entire content of the priority applications is incorporated herein by reference.

BACKGROUND OF THE INVENTION

1. Field of the Invention

The present invention relates to an image processing device capable of transmitting to a predetermined destination images read from an object, such as a document.

2. Description of the Related Art

There has been known an image reading device having an image transmitting capability. In such a device, an image read from an object can be transmitted to a predetermined destination. It has also been known to transmit an image to a predetermined email address if a character recognition function provided in the image reading device indicates that a prescribed character string is contained in the image.

SUMMARY OF THE INVENTION

However, with such a conventional image reading device, all of the images each read from each page of a plural-page-object are transmitted to the predetermined email address. Despite the fact that some particular images selected from the plurality of images read from the plural-page-object want to be transmitted but the remaining images do not want to be transmitted to the predetermined email address, selective image transmission cannot be achieved with the above-described image reading device.

In order to resolve the above-mentioned problems accompanying the conventional devices, it is an object of the invention to provide an image processing device that transmits only selected images but not to transmit unselected images to a predetermined destination.

In order to achieve the above and other object, there is provided an image processing device that includes a reading section, a judging section and a transmission section. The reading section reads an image on each of a plurality of objects and outputs a plurality of pieces of image data. Each piece of image data represents the image on each of the plurality of objects. The judging section judges whether each piece of image data meets a predetermined criterion. The transmission section transmits one or more pieces of image data that are judged by the judging section to meet the predetermined criterion to a predetermined destination set in relation with the criterion.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

Referring to the drawings, description will be made with respect to a multifunction peripheral (hereinafter abbreviated to "MFP") as an example of image processing devices.

Figure 1:
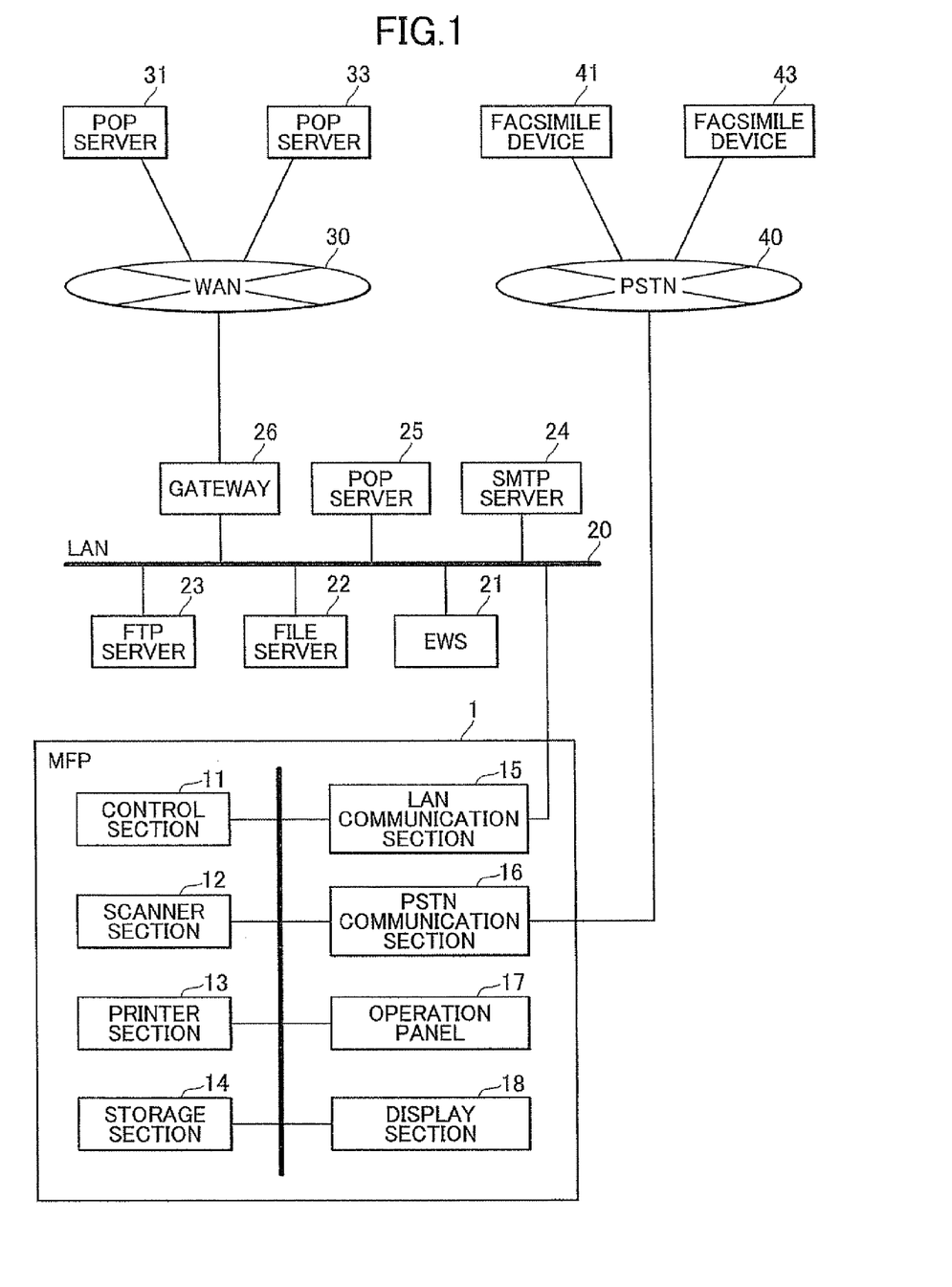
FIG. 1 is a block diagram illustrating the arrangements of a multifunction peripheral and a reception-side equipment to which image data is transmitted from the multifunction peripheral.

As shown in FIG. 1, the MFP 1 is a versatile peripheral device having a scanner function, a printer function, a copier function, a facsimile transmission/reception function, a telephone function, and a network communications function. The MFP 1 includes a control section 11, scanner section 12, printer section 13, storage section 14, LAN communication section 15, PSTN communication section 16, operation panel 17 and display section 18.

The scanner section 12 includes an image sensor for optically reading images from an object to be read, such as document, and an auto document feeder (ADF) for feeding a plurality of documents one by one. With the image sensor, a plurality of images can be continuously read from the documents which are sequentially fed by the ADF.

The storage section 14 includes a hard disk drive, a large-capacity non-volatile memory, and a random access memory (RAM). Typically, the hard disk drive and the large-capacity non-volatile memory are used for storing large-sized data and also data not to be lost when power supply is interrupted. The RAM is used for temporarily storing, for example, image data read from a document by the scanner section 12.

The LAN communication section 15 is configured from a communication interface for connecting to a Local Area Network (LAN) 20. By virtue of the LAN communication section 15, the MFP 1 is capable of performing data communications through the LAN 20 with an equipment, such as an Engineering Workstation (EWS) 21, file server 22 (for example, Common Internet File System (CIFS) server), FTP server 23, SMTP server 24, POP server 25, as shown in FIG. 1. In this embodiment, the LAN 20 is connected through a gateway 26 to a Wide Area Network (WAN) 30, such as Internet. Accordingly, the MFP 1 having the LAN communication section 15 is capable of performing data communications through the WAN 30 with a remote equipment. POP servers 31 and 33 are exemplified in FIG. 1 as the remote equipment.

The PSTN communication section 16 includes, for example, a facsimile modem, an audio CODEC, and the like whichever are needed in connecting to a Public Switched Telephone Networks (PSTN) 40. By virtue of the PSTN communication section 16, the MFP 1 is capable of performing audible communications, facsimile communications, or data communications through the PSTN 40 with a remote equipment. Facsimile devices 41, 43 are exemplified in FIG. 1 as the remote equipment communicable through the PSTN 40.

Prior to describing details of the process executed by the MFP 1, description will be made with respect to the automatic document distributed-transmission carried out by the MFP 1.

The automatic document distributed-transmission refers to an automatic selection of image data to be sent to a specified destination. In carrying out the automatic document distributed-transmission, a plurality of pieces of image data is sequentially obtained by reading a plurality of documents on a document-by-document basis. Transmission destination of each piece of the image data is determined based on an appointed feature contained in the image data. Once the transmission destination is determined, transmission of the image data is carried out.

The feature contained in the image data encompasses: (1) inclusion of a specified character string, such as conference, minutes, in the image; (2) inclusion of a uniquely shaped table in the image; (3) inclusion of an image region in the document; and (4) inclusion of a specified character string about private information, such as name, address, telephone number, in the document. The above features can be extracted from the image data through an Optical Character Recognition (OCR) or pattern recognition in which the image on a document is separated into an image region and a text region. Determination of the transmission destination may be made based not only on one of the above features but also on combination of two or more features. For example, inclusion of both a specified character string and a uniquely shaped table in the document may be employ as a key to determine the transmission destination.

Various types of transmission are available in transmitting the image data. Specifically, the available types of transmission includes: (A) a file transfer transmission in which a file of the image data is transferred to a file server or an FTP server; (B) an email attachment transmission in which the image data is attached to an email as an attached file and transmitting the attached file along with an email message to the POP server via the SMTP server; and (C) a facsimile transmission in which the image data is converted into facsimile data and transmitting the latter to an equipment provided with a facsimile transmission/reception function. In any type of transmission, one or more transmission destination can be designated.

Figure 2:
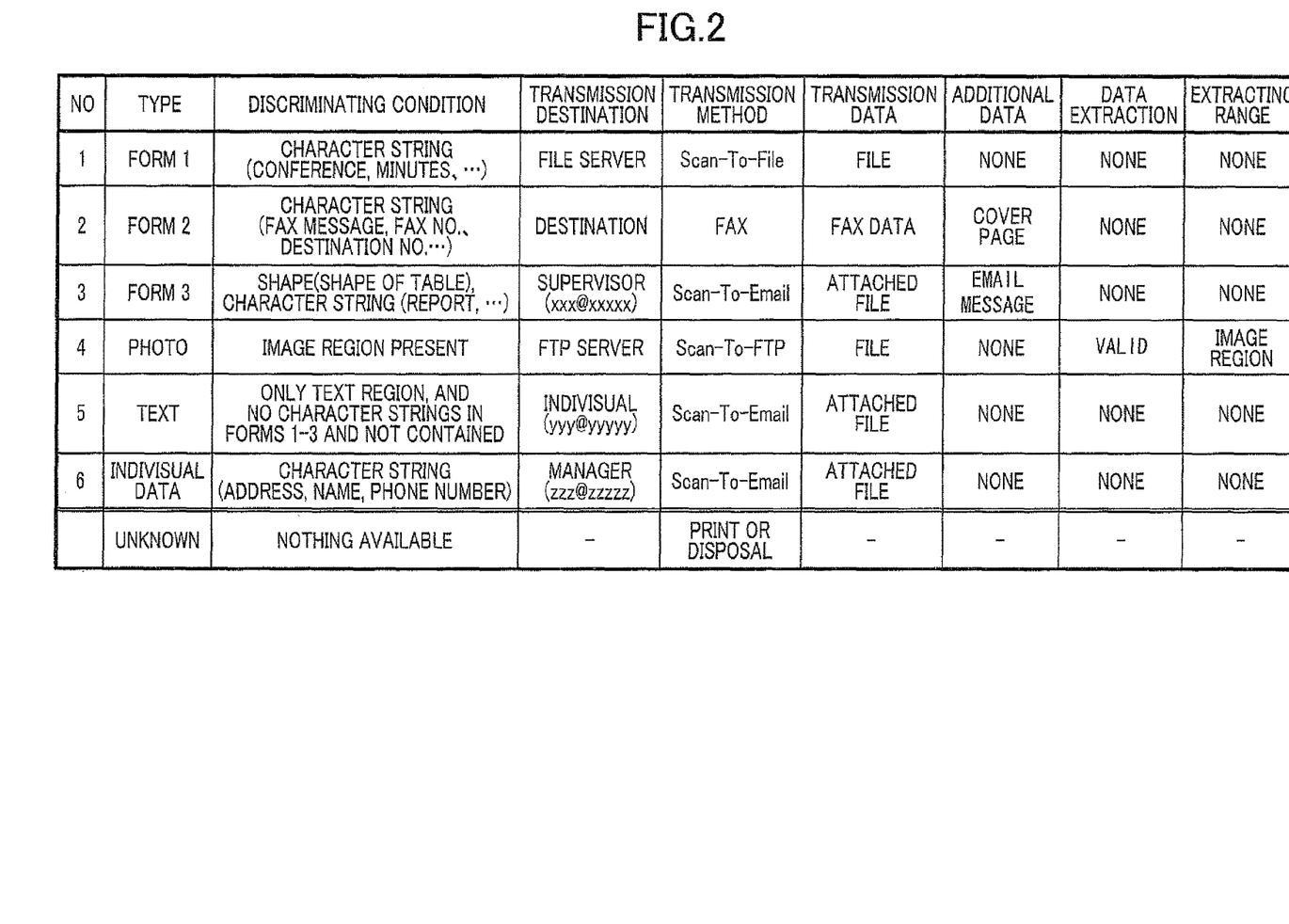
FIG. 2 is a management table used in transmission of the image data from the multifunction peripheral to the reception-side equipment.

The relationship between the feature contained in the image data, the transmission destination, and the type of transmission is registered in a management table provided in the MFP 1. The management table is stored in the storage section 14 of the MFP 1 and the logical data structure is shown in FIG. 2.

The management table includes several records (six records being shown in FIG. 2), each being made up of nine columns entitled "number (No)", "type", "discriminating condition", "transmission destination", "transmission method", "transmission data", "additional data", "data extraction", and "extracting range". The "number" is a serial number assigned to each record. The "type" is a name of the image arbitrarily given by the user to facilitate recognition of the type of the image.

Of the nine items in each record, the "discriminating condition", "transmission destination", "transmission method", and "transmission data" indicate what kind of features the image data contains, the destination to which the image file is transmitted, data type of the image file, and what kind of transmission is utilized.

More specifically, the MFP 1 refers to the management table during the process to be described later and determines that each piece of image data contains the features recited in the column of "discriminating condition". When the image data contains such features, the MFP 1 determines the transmission destination, data type and the method of transmission based on the information provided in the "transmission destination", "transmission method", and "transmission data" of the corresponding record.

To facilitate registering in the cell of "discriminating condition", some candidate entries have been prepared in advance, such as "a specific character string existing in a text region", "an image region present". The user can select one or more candidate entries and register the selected entries in the cell of "discriminating condition". When the selected entry includes an optional part, such as "a specific character string", the user can specify what the specific character string is.

In the example shown in FIG. 2, the "discriminating condition" in the No. 1 record indicates "a specific character string exists in a text region". The "specific character string" is an optional part and the user can specify what the "specific character string" is. In the example shown in FIG. 2, "meeting" and "minutes" are set as the "specific character string".

The item "transmission destination" is to designate the transmission destination with a character string, such as an email address or a network address (IP address or URL). A predetermined number of methods of transmission have been prepared in advance for registering in the cell of "transmission method". As previously described, the "transmission method" can be selected from: (A) a file transfer (in this embodiment, the file transfer is either "scan-to-file" or "scan-to-FTP"); (B) an email attachment transmission; and (C) a facsimile transmission. A plurality of transmission methods has been prepared in advance for allowing the riser to select a relevant one. The selected transmission method is registered in the cell of the "transmission method".

For the sake of easy explanation, FIG. 2 indicates, for example, "scan-to-file" as the selected method for transmission. However, the actual management table may be configured so that data indicating a selected transmission method (for example, a flag made up of several bits) is stored in the cell of the "transmission method". The "transmission data" included as one of columns of the management table indicates the type of data in conjunction with the "transmission method".

The "additional data" is an item to designate whether additional data is attached or not for transmission along with the image data. The type of additional data changes depending upon the transmission method. For example, a cover page is the additional data for the facsimile transmission. The image data is transmitted following the transmission of the cover page.

In the case of email transmission, the email message is transmitted as the additional data. Specifically, in the absence of the additional data, the email transmission is made with no email message but only the image data as the attached file. On the other hand, when the additional data is given, the email message is transmitted along with the image data as the additional data.

The additional data is prepared in the form of an image or a character string which may include a line feed, and registered in the corresponding cell of each record. The "data extraction" is an item to indicate whether the image data is transmitted upon extracting a part from the image data. The data extraction is done when "data extraction=YES". The overall image data is transmitted as it stands when "data extraction=NO". The "YES" or "NO" indication for the "data extraction" may be replaced with binary data distinctly indicative of "YES" and "NO".

In the case of "data extraction=YES", information about the regional range in which data extraction is carried out is stored in the cell of "extracting range". The management table shown in FIG. 2 indicates "data extraction=YES" and "extracting range=image region". In accordance with such indications in the management table, the MFP 1 extracts only the image region from the results of pattern recognition process distinctly proving the Image region and the text region. The extracted image region is subject to transmission to the destination. The indication of "image region" or "text region" in the management table may be replaced with binary data distinctly indicative of "image region" or "text region". Alternatively, the extracting range may be specified with relative coordinates in which a predetermined position in the image data is set to an origin.

Image data that does not match any of the records from No. 1 to No. 6 is dealt as "type=Unknown". Such unknown image data is not subject to transmission but subject to printing or disposal. The user can select whether the unknown image data is to be printed or disposed of and information about how the unknown image data is to be dealt with is registered in the management table.

The user can enter relevant information into each of the items of the management table beforehand. Entry of the information into the management table can be performed through manipulation of the operation panel 17 while checking the information displayed on the display section 18.

Figure 3A:
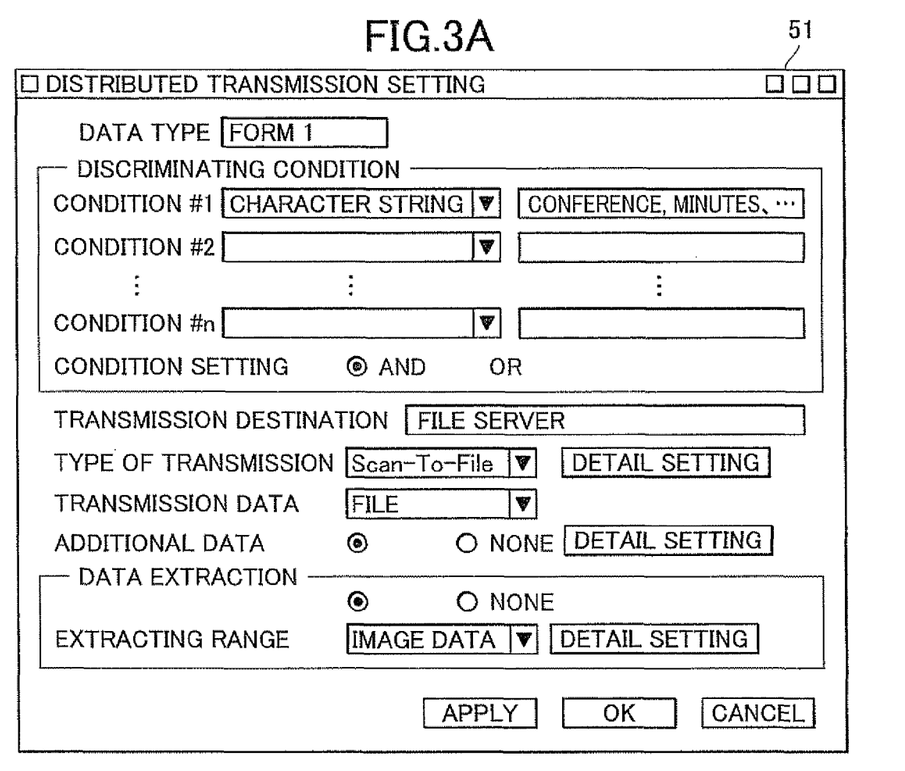
FIG. 3A is an explanatory diagram illustrating a user interface for entering instructions in the management table.

The contents of the management table can be edited or updated through manipulation of equipments other than the MFP 1, such as EWS 21. To this effect, it is assumed that the MFP 1 serves as a web server and offers a web page for entering information into the management table. This web page is accessible by a web browser installed in the EWS 21. When this web page is accessed, the management table data entry form 51 is displayed as shown in FIG. 3A. The management table data entry form 51 shows input items for one record constituting the management table. The management table can be edited or updated by selecting one of a plurality of options indicated in a pull-down box, operating a radio switch to select one of a predefined set of options, and inputting information into the input columns.

More specifically, the input item "Discriminating Condition" contained in the management table data entry form 51 is capable of accepting a plurality of conditions (Condition #1 to Condition #n). A radio switch is provided for selecting either "AND" or "OR" for logical conjunction of the plurality of conditions as entered. For example, when two discriminating conditions, such as "shape" and "character string" as in the No. 3 record shown in FIG. 2, are ANDed by selecting "AND", judgment is made so that image data corresponding to "Type"="Form 3" is identified.

Figure 3B:
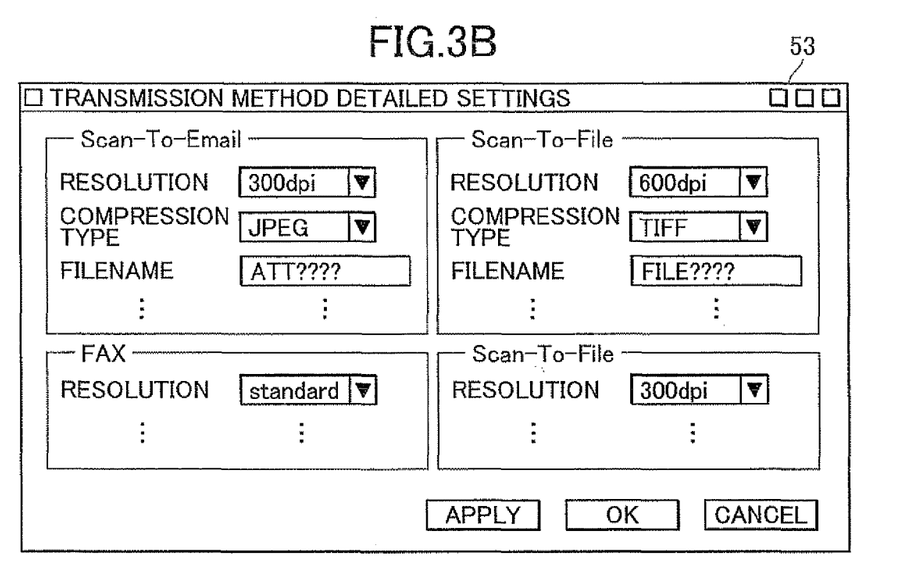
FIG. 3B is an explanatory diagram illustrating a user interface for entering detailed instructions in the management table.

The management table data entry form 51 contains still further buttons for entering more detailed information. By clicking such buttons with the use of a pointing device or by operating pre-selected keys on a keyboard to which the function of the pointing device is assigned, detailed information can be entered into the management table. For example, when the user clicks the "Detailed Setting" button provided in connection with the input item "Transmission Method" contained in the management table data entry form 51, the transmission method detailed information entry form 53 as shown in FIG. 3B is displayed. The entry form 53 allows the user to set resolution of the image data, compression type applied to the image data, filename and so on with respect to each of a plurality of different transmission methods.

Next, an automatic document distributed-transmission process to be executed in the MFP 1 will be described while referring to the flowcharts shown in FIGS. 4 to 7. This process is undertaken when the user instructs the MFP 1 to execute the automatic document distributed-transmission upon setting a plurality of sheets of original documents on the ADF of the scanner section 12.

Figure 4:
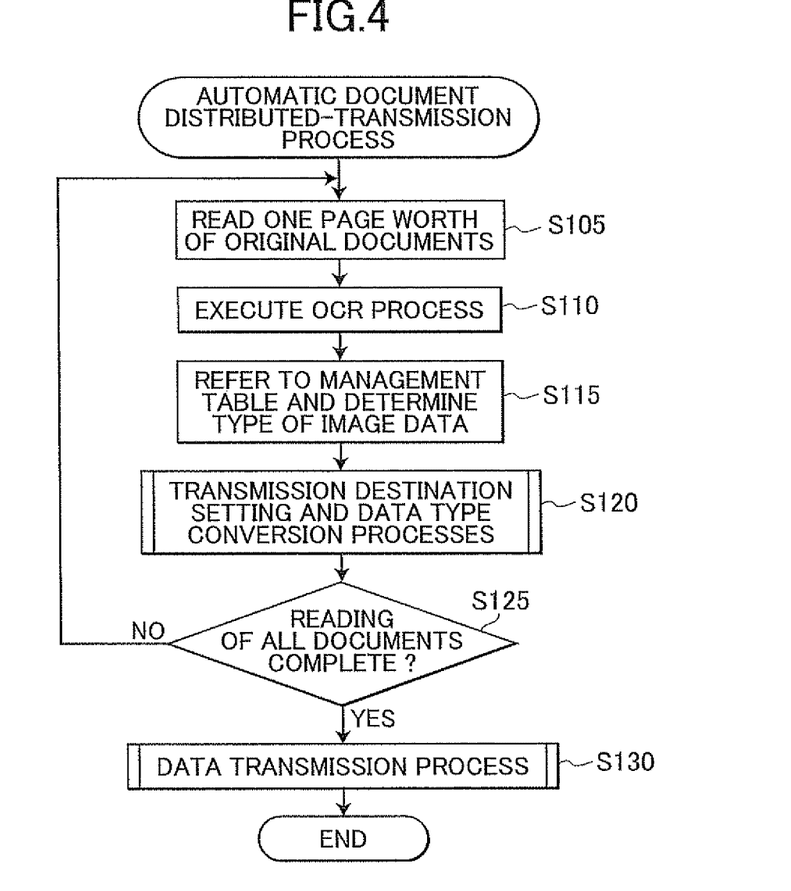
FIG. 4 is a flowchart illustrating an automatic document distributed-transmission process.

When the process starts, the MFP 1 reads one page worth, that is the first full page, of the original documents in the scanner section 12 (S105) and executes an OCR process (S110). In S110, the image data representing the first page of the original documents is subject to a pattern recognition process so that the image data is classified into text region, image region, and other region. The part of the image data region recognized as the text region is converted into text data through the character recognition process.

When the process in S110 completes, the MFP 1 refers to the management table and determines the type of the image data. Specifically, one of the plurality of records contained in the management table is selected and the MFP 1 judges whether the image data obtained through scanning the original document meets the discriminating condition set in the selected record. For example, if the discriminating condition includes "specific character string (for example, conference, minutes, etc.)", the MFP 1 judges whether the corresponding character string is contained in the text data obtained through the character recognition process. As another example, if the discriminating condition includes "image region present", the MFP 1 judges whether an image region is contained in the regions classified through the pattern recognition process. Other conditions that can be discriminated through conventionally known pattern recognition processes or character recognition processes may be adopted as the discriminating condition.

Whether the image data in question meets the discriminating condition is repeatedly carried out on a record-by-record basis until the judgment reveals that the image data in question meets any one of the discriminating conditions. If none of the records in the management table does not describe the discriminating condition being sought, the image data in question is treated as being unknown ("Type"="Unknown").

The judgment as to whether the image data in question meets the discriminating condition in each of the records may either be carried out sequentially in an order of the number assigned to the records or be carried out in an order of priority awarded to the records.

If the image data in question meets two or more discriminating conditions through the judgment performed with respect to all the records, the discriminating condition with the highest priority may be adopted or which discriminating condition should be adopted may be determined according to the user's discretion. In the latter case, the user is invited to perform the selection of the discriminating condition on the operation panel 17.

The type of the image data is determined when any one of the discriminating conditions is identified (S115). As a result, for the type of the image data thus determined, the "transmission destination", "transmission method", "transmission data", "additional data", "data extraction" and "extracting range" are identified.

Figure 5:
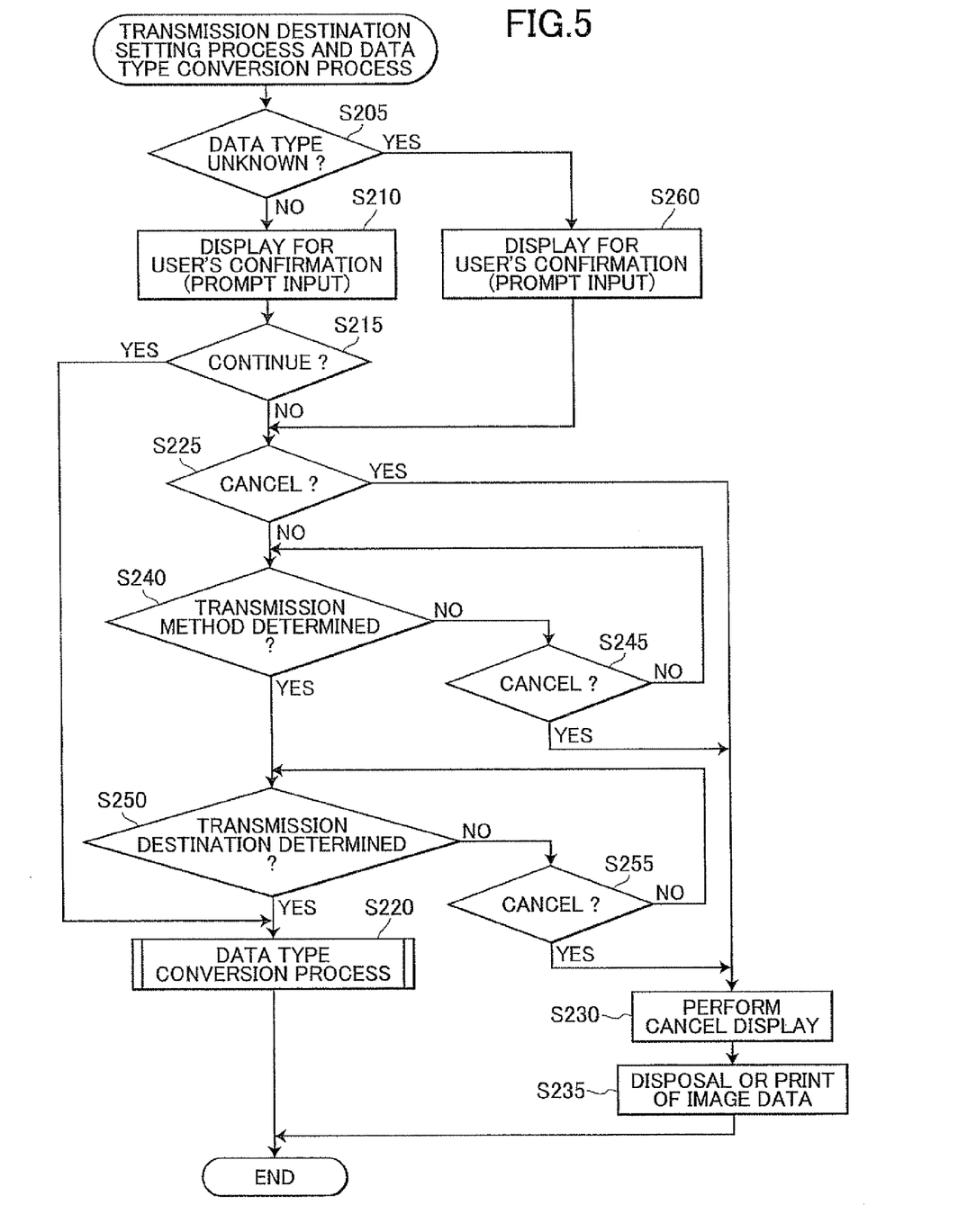
FIG. 5 is a flowchart illustrating a transmission destination setting process and a data type conversion process.

After the process in S115 completes, the MFP 1 carries out the transmission destination setting process and data type conversion process (S120). Details of these processes in S120 are shown in the flowchart of FIG. 5. When the transmission destination setting process and the data type conversion process are commenced, the MFP 1 first judges whether or not the data type is unknown (S205). When the data type is identified (S205: NO), a confirmation screen is displayed for the user's convenience and the MFP 1 is placed to accept the user's input (S210).

Figure 8:
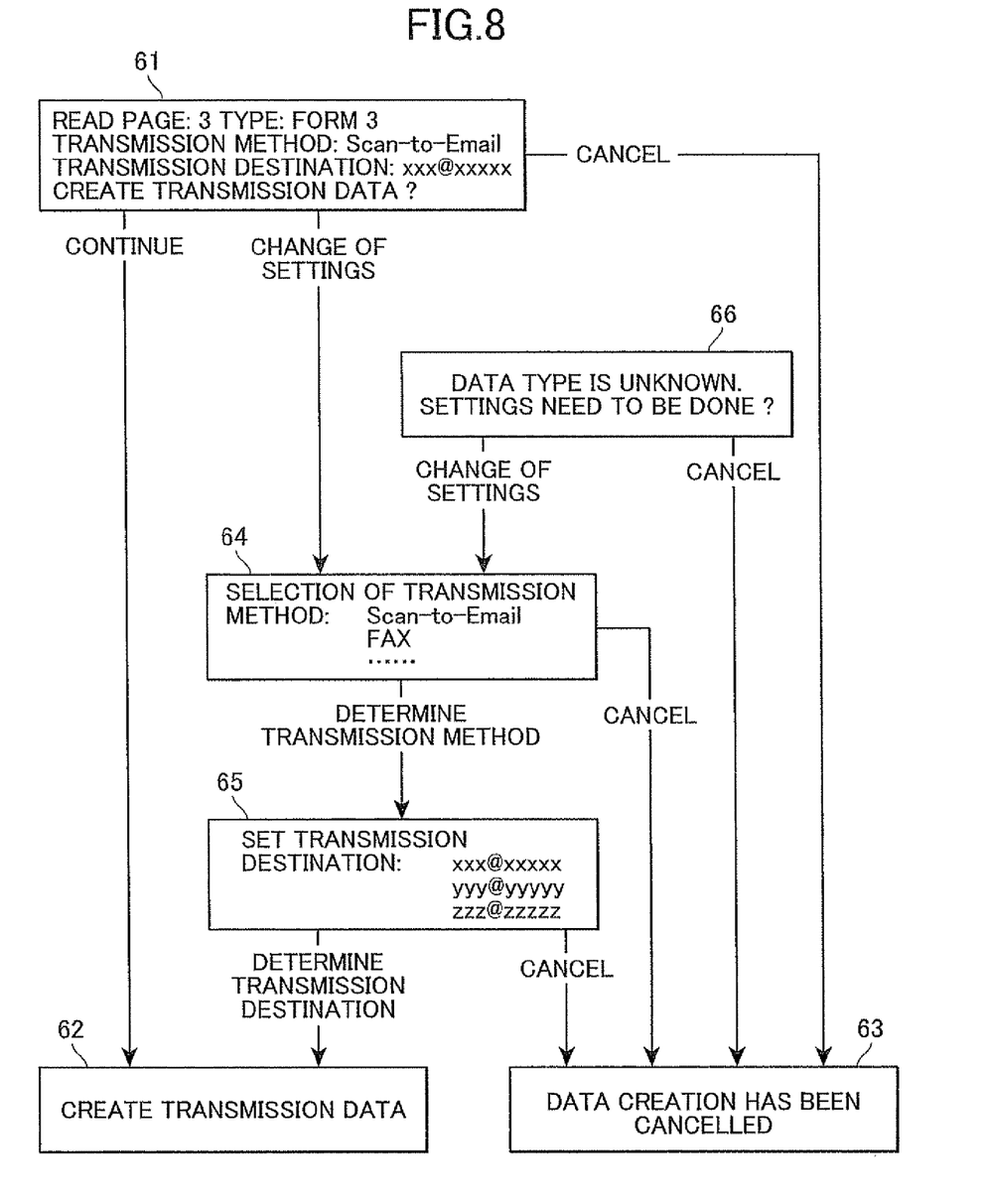
FIG. 8 is an explanatory diagram illustrating displayed contents on a display screen when a transmission destination is set.

At this time, the display section 18 displays the contents 61 as shown in FIG. 8. Upon conferring the displayed contents 61, the user has to select either one of "change of settings", "continue", and "cancel". When one is selected, the MFP 1 determines whether or not "continue" is selected (S215). When "continue" is selected (S215: Yes), the MFP 1 carries out the data conversion process (S220). When the routine proceeds to S220, the display section 18 displays the contents 62 shown in FIG. 8. Details of the data type conversion process are illustrated in the flowchart shown in FIG. 6.

Figure 6:
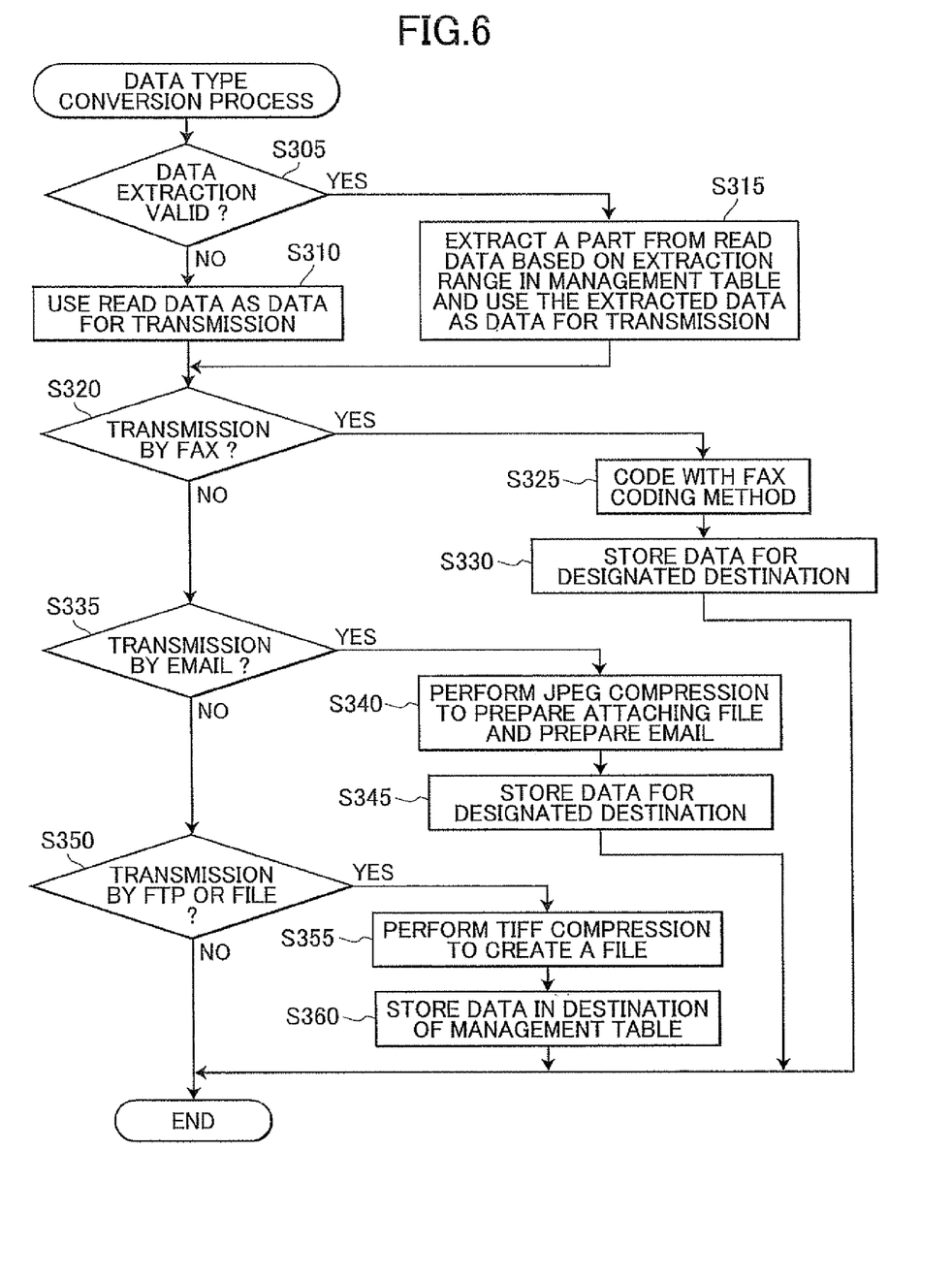
FIG. 6 is a flowchart illustrating details of the data type conversion process.

When the data type conversion process is commenced, the MFP 1 first refers to the management table and judges whether or not the "data extraction" is valid (S305). If the "data extraction" is invalid or none (S305, No), the MFP 1 uses the read data as the data for transmission (S310).

On the other hand, when "data extraction" is determined to be valid (S305; Yes), a part of the read image data is extracted based on the instruction written in the "extracting range" of the management table and the resultant image data is used for transmission (S315).

More specifically, assuming that the image data in question corresponds to "Number"="4" and "Type"="Photo" in the management table shown in FIG. 2, an affirmative decision is made in S305 based on the instruction of "data extraction="valid". In S315, among the text region and image region as classified at the time of pattern recognition process, only the image region is extracted for transmission purpose based on the instruction of "extracting range"="image" as contained in the management table.

After execution of the process in S310 or S315, the MFP 1 judges whether or not the facsimile transmission is to be performed to know the transmission method (S320). In the management table shown in FIG. 2, with respect to the image data that corresponds to "Number"="2" and "Type"="form 2", an affirmative decision is made in S320 based on the instruction of "Transmission Method"="FAX". When the transmission is made by way of facsimile (S320: Yes), the data subject to transmission is coded with a FAX coding method, such as MH coding or MR coding (S325), and the resultant data is stored for transmission to the designated destination specified in the management table (S330). For example, the "Transmission Destination" in the record corresponding to "Number"="2" of the management table is referred to in S330 and the coded data is stored for facsimile transmission to the designated destination.

It should be noted that in the process of S330, actual facsimile transmission is not performed but the data for the facsimile transmission is only stored in a storage area reserved for the transmission destination. Because the storage area is separately reserved for each transmission destination, storing a plurality of pieces of image data in the same storage area allows transmission of all pieces of image data to the same transmission destination.

On the other hand, when the transmission is not performed by way of facsimile (S320: No), the MFP 1 judges whether the transmission should be performed by way of email (S335). An affirmative decision is made m S335 if instruction contained in the management table indicates "Transmission Method"="Scan-To-Email".

In the case of email transmission (S335: Yes), the image data for transmission is subject to JPEG compression to prepare a file for attaching to an email message (S340). In S340, the JPEG compression of the image data is to reduce the amount of data. The JPEG compressed image data is coded by, for example, BASE 64 for conversion to a data format capable of being transmitted as an attached file of an email. The data to be attached to the email message is stored in the designated storage area (S345). It should be noted that in the process of S345, for the same reason stated in connection with the process in S330, actual email transmission is not performed but the data prepared for attaching to the email message is only stored in a storage area reserved for the transmission destination.

On the other hand, when the transmission is not to be performed by way of email (S335: No), the MFP 1 judges whether or not the transmission method is "FTP or File" (S350). An affirmative decision is made in S350 based on the instruction of "Transmission Method"="Scan-To-File" or "Transmission Method"="Scan-To-FTP" as contained in the management table. When the transmission method is FTP or File (S350: Yes), the image data for transmission is subject to TIFF compression to provide a compressed data (S355). In S355, the TIFF compression of the image data is to reduce the amount of data. The TIFF compressed image data is converted to a file having a data format suitable for transmission to the file server 22 or FTP server 23. The resultant data is stored in a relevant storage area for transmission to the corresponding destination specified in the management table (S360). In the process of S360, for the same reason stated in connection with the process in S330, actual transmission is not performed but the data for transmission is only stored in a storage area reserved for the transmission destination.

The above-described embodiment employs JPEG compression in the case of email transmission and TIFF compression in the case of file transfer. However, the type of compression to be employed for the respective transmissions is not determinative as above but can be determined arbitrarily. The compression type can be arbitrarily altered for each transmission method through manipulation of the user interface shown in FIG. 3B.

Upon completion of any one of the processes in S330, S345 and S360, the overall processes in FIG. 6 is ended. The end of the data type conversion process illustrated in FIG. 6 means the end of the process in S220 of the flowchart shown in FIG. 5.

Referring back to the flowchart in FIG. 5, the process in S220 is executed when an affirmative decision is made in S215 but the affirmative decision is not made in S215 if the "Continue" instruction is not entered by the user (S215: No). In the latter case, the MFP 1 judges whether or not a "Cancel" instruction is entered (S225). When the "Cancel" instruction is entered (S225: Yes), the MFP 1 displays a message in the context that the data creation is cancelled (S230). The display section 18 displays a message 63 reading "Data creation has been cancelled" as shown in FIG. 8. Upon completion of the process of S230, the image data is either disposed of or printed (S235). Whether the image data is disposed of or printed is determined depending upon the settings in the management table.

The fact that the "Cancel" instruction is not entered (S225: No) indicates that the "Change of Settings" instruction is entered. When it is the case, the MFP 1 judges whether the transmission method has been determined (S240). At this time, the display section 18 displays a message 64 as shown in FIG. 8. In S240, judgment is made as to whether or not operation for determining the transmission method has been performed. When such an operation has not been performed (S240: No), further judgment is made as to whether or not the "Cancel" instruction has been entered (S245). If the "Cancel" instruction has not been entered (S245: No), the routine returns to S240. In this manner, the processes in S240 to S245 are repeatedly executed until the operation for determining the transmission method or operation for instructing "Cancel" has been performed. When the "Cancel" instruction is entered during the repeated execution of the processes in S240 to S245 (S245: Yes), the routine proceeds to S230. As a result, a cancel display is performed (S230) and then disposal or print of the image data is performed (S235).

On the other hand, when the operation for determining the transmission method is performed during the repeated execution of S240 to S245 (S240: Yes), the transmission method is determinative at this stage. Specifically, when the transmission method different from the one determined in S115 is determined in the process of S240, the transmission method is altered to the one determined in S240. When the transmission method is determined, the MFP 1 judges whether the transmission destination is determined (S250). At this time, the display section 18 displays a message 65 as shown in FIG. 8.

The process in S250 is to judge whether or not the operation for determining the transmission destination has been performed. If such an operation has not been performed (S250: No), judgment is made as to whether or not the "Cancel" instruction has been entered (S255). If the "Cancel" instruction has not been entered (S255: No), the routine returns to S250. The processes in S240 to S245 are repeatedly executed until the operation for determining the transmission destination or operation for instructing "Cancel" has been performed. When the "Cancel" instruction is entered during the repeated execution of the processes in S250 to S255 (S255: No), the routine proceeds to S230. As a result, a cancel display is performed (S230) and then disposal or print of the image data is performed (S235).

On the other hand, when the operation for determining the transmission destination is performed during the repeated execution of S250 to S255 (S250: Yes), the transmission destination is determinative at this stage. Specifically, when the transmission destination different from the one determined in S115 is determined in the process of S250, the transmission destination is altered to the one determined in S250. When the transmission destination is determined, the MFP 1 executes the data type conversion process as previously described (S220).

As described above, in the process shown in FIG. 5, the MFP 1 executes either the data type conversion process in S220 or disposal or print of the image data in S235, whereupon the overall processes in the flowchart of FIG. 5 are ended.

The end of the processes in the flowchart of FIG. 5 means the end to the process in S120 of the flowchart shown in FIG. 4. Then, the MFP 1 judges whether or not reading of all pages of the document is complete (S125). It should be noted that the processes in S105 to S120 are performed for each page of the document conveyed by the ADF of the scanner section 12. Accordingly, if some pages remain in the ADF, judgment is made in S125 so that reading of all pages of the document is not complete (S125: No).

In this case, the routine returns to S105 and the processes in S105 to S120 are repeatedly executed. During the repeated execution of the processes in S105 to S120, image data is sequentially read from each page of the documents. Based on the feature of each image data, the image data is converted to one of the FAX data, email data, and file data.

Figure 7:
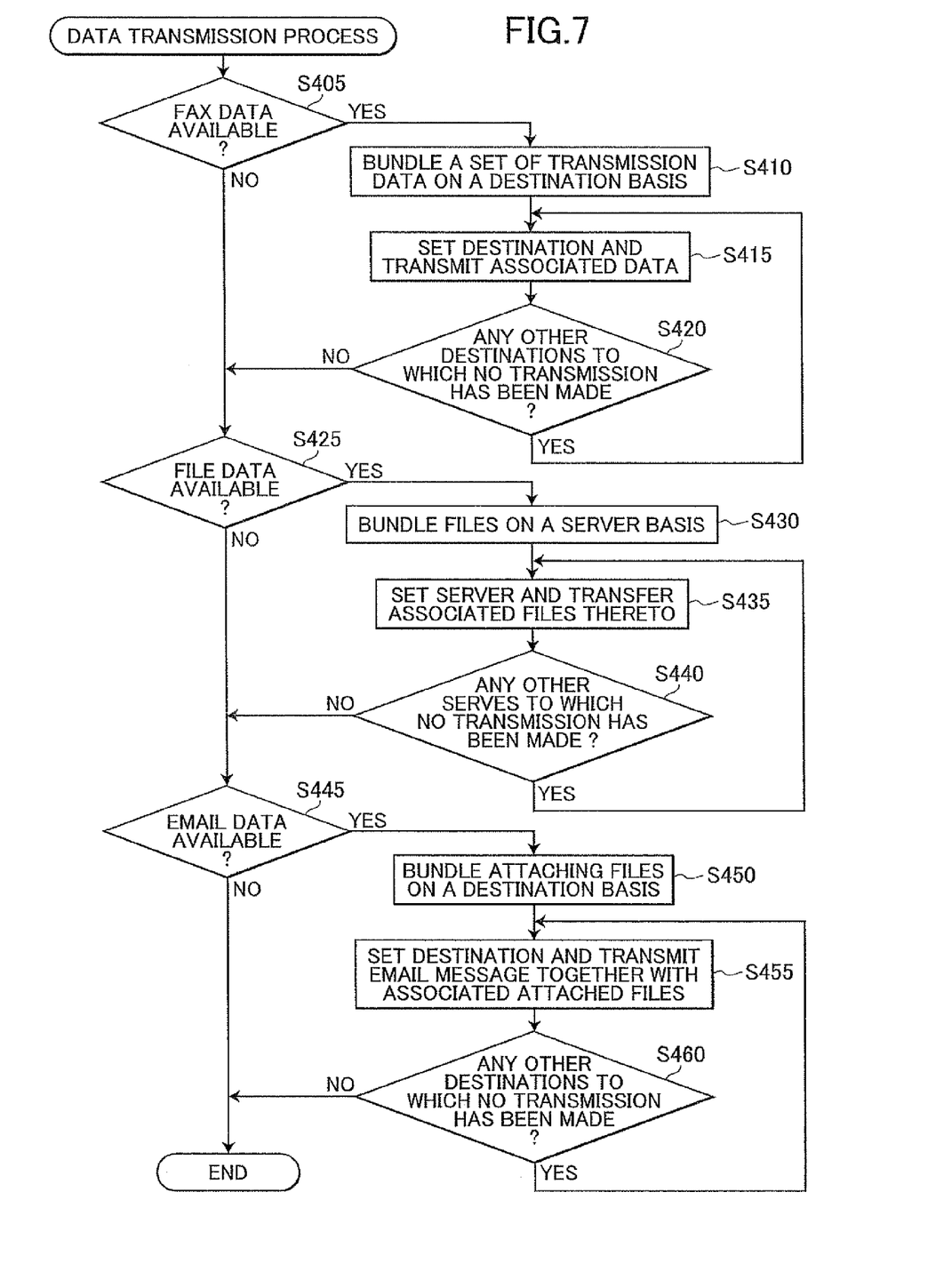
FIG. 7 is a flowchart illustrating a data transmission process.

When no pages remain in the ADF of the scanner section 12 as a result of the repeated execution of the processes in S105 to S120, the step of S125 makes a decision that reading of all pages of the document is complete (S125: Yes). Then, the MFP 1 executes a data transmission process (S130). Details of the data transmission process are illustrated in the flowchart of FIG. 7.

When the data transmission process starts, the MFP 1 judges whether or not the FAX data is available (S405). The FAX data is available when the previously executed processes in S325 and S330 prepare and store the FAX data. When the FAX data is available (S405: Yes), the MFP 1 bundles a set of transmission data on a destination basis (S410). More specifically, in the previously executed processes in S325 and 330, the FAX data is created one after another in an order in which the documents are read with the scanner section 12 and the read data is stored in a storage area specified in connection with the destination. In S410, a set of transmission data for transmission to the same destination is bundled.

The MFP 1 sets the destination, using the PSTN communication section 16 and transmits the transmission data (S415). More specifically, a facsimile connection is established between the MFP 1 and a destined equipment, such as facsimile device 41 or 43 by setting a facsimile number of the destined equipment and making a call. Once the connection is established, a set of transmission data as bundled in S410 is transmitted en bloc and then the MFP 1 is disconnected from the destined equipment upon completion, of transmission.

When the process in S415 is complete, the MFP 1 judges whether or not there remains destinations to which no transmission has been made (S420). When there remains destinations to which no transmission has been made (S420: Yes), the routine returns to S415 and another data transmission to the second destination is made. The FAX data transmission completes when there remains no destinations outstanding as a result of the repeated executions for making data transmission to different destinations (S420: No), whereupon the routine proceeds to S425. When it is judged that the FAX data is not available (S405: No), the routine proceeds to S425.

In S425, the MFP 1 judges whether or not the FTP or file data is available. The FTP or file data is available when the previously executed processes in S355 and S360 prepare the data to be stored in the FTP server or file server. When the FTP or the file data is available (S425: Yes), the MFP 1 bundles a set of transmission data on a server basis (S430). More specifically, in the previously executed processes in S355 and 360, files are created one after another in an order in which the documents are read with the scanner section 12 and these files are stored in a storage area specified by the destination. In S430, a set of files for transmission to the same destination is bundled.

The MFP 1 sets the server using the LAN communication section 15 and transfers the associated files thereto (S435). More specifically, using a protocol adapted to the destined server (file server/FTP server), a connection is established between the MFP 1 and a destined server, such as file server 22 or FTP server 23. Once the connection is established, a set of files as bundled in S430 is transmitted en bloc and then the MFP 1 is disconnected from the destined equipment upon completion of transmission.

When the process in S435 completes, the MFP 1 judges whether or not there remains servers to which no transmission has been made (S440). When there remains servers to which no transmission has been made (S440: Yes), the routine returns to S435 and another data transmission to the second server is made. The file transfer completes when there remains no servers outstanding as a result of the repeated executions for making file transfer to different servers (S440: No), whereupon the routine proceeds to S445. In S445, when it is judged that the FTP or file data is not available (S425: No), the routine proceeds to S445.

In S445, the MFP 1 judges whether or not the email data is available. The email data is available when the previously executed processes in S340 and S345 prepare the data to be attached to the email message. When the email data is available (S445: Yes), the MFP 1 bundles a set of attaching files on a destination basis (S450). More specifically, in the previously executed processes in S340 and 345, attaching file data are created one after another in an order in which the documents are read with the scanner section 12 and the file data are stored in a storage area specified in connection with the destination. In S450, a set of data files for transmission to the same destination is bundled.

The MFP 1 sets the destination using the LAN communication section 15 and transmits the attached files together with the email message (S455). More specifically, email data is created by attaching the files bundled in S450 to the header portion, in which the destined email address is described. Then, a connection is established between the MFP 1 and the SMPT server 24, and an email is transmitted to the SMTP server 24. The MFP 1 is disconnected from the SMTP server 24 upon completion of the email transmission. The email transmitted to the SMTP server 24 is further transferred to the POP server 25, 31 or 33 from the SMTP server 24.

When the process in S455 completes, the MFP 1 judges whether or not there remains destinations to which no transmission has been made (S460). When there remains destinations to which no transmission has been made (S460: Yes), the routine returns to S455 and another email transmission to the second destination is performed. The email transmission completes when there remains no destinations outstanding as a result of the repeated executions for performing the email transmission to different destinations (S440: No), whereupon the process shown in FIG. 7 is ended. The end of the data transmission process illustrated in FIG. 7 means the end of the process in S130 of the flowchart shown in FIG. 4. Accordingly, the automatic document distributed-transmission process shown in FIG. 4 is ended.

As described in detail above, with the MFP 1 according to the embodiment of the invention, image data that meets the discriminating condition is selected from a plurality of pieces of image data read with the scanner section 12 through the execution of processes in S110 to S115. The selected pieces of image data are transmitted to a prescribed transmission destination set in relation with the discriminating condition. Accordingly, even if the image data that meets the discriminating condition and the image data that does not meet the discriminating condition coexist in the plurality of pieces of image data, the latter type of the image data is not transmitted to the transmission destination and only the former type of the image data is transmitted to the transmission destination.

According to the image processing device as described, unlike the conventional device in which all pieces of image data are transmitted en block to the same destination, only selected pieces of image data can be transmitted to the relevant transmission destination in the MFP 1 described above. The image data that does not meet the discriminating condition is not subject to transmission so that it is not necessary for the user to remove the unwanted pages of the document before performing the reading operation of the document or before transmission of the image data.

Further, as shown in FIG. 2, the MFP 1 according to the embodiment stores a plurality of prescribed transmission destinations each being set in relation with each of a plurality of discriminating conditions. Among the plurality of prescribed transmission destinations, a transmission destination in relation with the image data meeting the discriminating condition is selected and the image data is transmitted to the selected destination. Accordingly, several pieces of image data each meeting any one of the plurality of discriminating condition can be selected from a plurality of pieces of image data and each of the respective pieces of image data can be transmitted to the respective destinations.

According to the above-described MFP 1, two or more pieces of image data that are judged to be transmitted to the same destination can be transmitted en bloc through the processes in S410 to S420, S430 to S440 and S450 to S460. Accordingly, in comparison with the case in which each of a plurality of pieces of image data is transmitted each time when the transmission destination of each piece of image data is determined, communication times can be reduced.

As shown in FIG. 3, the MFP 1 is capable of setting a plurality of conditions #1 to #n as the discriminating condition and any or all of the plurality of conditions #1 to #n can be set as the discriminating condition by an AND conjunction or an OR conjunction. As such, the discrimination can be implemented appropriately depending upon the difference in discriminating condition.

Moreover, the MFP 1 can judge that the image data meets a discriminating condition when a pattern contained in the image data is recognized as being a prescribed type of image or a prescribed character or character string, judgment is made so that the image data meets the discriminating condition through the processes in S110 and S115. Accordingly, the image data that is judged to fall in a specified category or that contains the prescribed character or character string can be transmitted to a relevant destination.

With respect to the image data read in the process of S315, a part of the image data is extracted in accordance with the settings in the extracting range. In such a case, only the extracted image data is transmitted to the destination. Accordingly, a redundant part of the image data is not transmitted but only the required portion of the image data is transmitted. The party who received the image data can save the job to remove the unwanted portion from the transmitted image data. Not transmitting redundant portion of the image data can improve transmission efficiency.

The portion of the image data for disposal or printing in S235 varies depending upon the settings. The image data not subject to transmission may be printed in the printer section 13 and retained in the form of a printed matter with which the presence of the transmitted image data can be readily confirmed after the transmission.

The image data not subject to transmission may disposed of in the process of S235 depending upon the settings. By the disposal of the image data, protection of confidential information can be assured without imposing the user on erasure of the confidential image data.

In addition, when the user wants to change the destination, the processes in S210 et seq allows the user to input instructions for changing the destination. The user can enter a new destination with the processes in S260 et seq if none of the discriminating conditions are met by the image data.

The processes in S320 to S360 allow the image data to modify to a suitable format so as to be adapted for various transmission methods.

Although the present invention has been described with respect to specific embodiments, it will be appreciated by one skilled in the art that a variety of changes may be made without departing from the scope of the invention.

In the above-described embodiment, the image data not subject to transmission is disposed of or printed in the process of S235. However, such image data may be retained by storing it in the storage section 14.

It should be noted that the hardware arrangement shown in FIG. 1 is only an example. A greater number of equipments than that shown in FIG. 1 may be set as destinations for transmission or the destinations employing different protocols than those described may be set as the destinations for transmission.

What is claimed is:

1. An image processing device comprising:
    a storage device configured to store a transmission management table having a plurality of transmission criteria associated with a plurality of destinations in an one-to-one correspondence, said transmission management table being used to determine a destination for a transmission of a plurality of pieces of image data;
    a reading section configured to read an image on each of a plurality of objects and output a plurality of pieces of image data for each of the plurality of objects, respectively, each piece of image data representing the image on each of the plurality of objects;
    a judging section configured to judge whether each piece of image data meets one or more of the plurality of transmission criteria;
    a destination determining section configured to determine, for each piece of image data judged by the judging section to meet one or more of the plurality of transmission criteria, a destination by referring to the transmission management table for the associated destination for the respective transmission criteria; and
    a transmission section configured to transmit each piece of image data judged by the judging section to meet one or more of the plurality of transmission criteria to the destination determined by the destination determining section without transmitting image data that does not meet any of the plurality of transmission criteria, wherein the plurality of transmission criteria and the plurality of destinations are stored in the transmission management table in advance of the reading section reading data associated with transmission of the image data.

2. The image processing device according to claim 1, wherein the transmission section is configured to transmit two or more pieces of image data en bloc to same destination.

3. The image processing device according to claim 1, wherein at least one of the plurality of transmission criteria includes a plurality of conditions, and when a piece of image data meets any one of the plurality of conditions, the judging section judges that the piece of image data meets the at least one of the plurality of transmission criteria.

4. The image processing device according to claim 3, wherein:
    the judging section is further configured to perform a pattern recognition with respect to each of the plurality of pieces of image data to indicate that each object includes character information and image information;
    the plurality of conditions includes a condition about character information and a condition about image information; and
    the judging section judges whether each piece of image data meets each of the plurality of transmission criteria by judging whether character information and image information included in a piece of image data are in coincidence with the condition about character information and the condition about image information, respectively.

5. The image processing device according to claim 1, wherein at least one of the plurality of transmission criteria includes a plurality of conditions, and when a piece of image data meets all of the plurality of conditions, the judging section judges that the piece of image data meets the at least one of the plurality of transmission criteria.

6. The image processing device according to claim 5, wherein:
    the judging section is further configured to perform a pattern recognition with respect to each of the plurality of pieces of image data to indicate that each object includes character information and image information;
    the plurality of conditions includes a condition about character information and a condition about image information; and
    the judging section judges whether each piece of image data meets each of the plurality of transmission criteria by judging whether character information and image information included in a piece of image data are in coincidence with the condition about character information and the condition about image information, respectively.

7. The image processing device according to claim 1, wherein when the judging section judges that a piece of image data meets one of the plurality of transmission criteria and when a data extraction range is set in relation with the one of the plurality of transmission criteria, the transmitting section transmits an extracted part of the piece of image data to the associated destination for the respective transmission criteria.

8. The image processing device according to claim 1, further comprising a print section that prints a piece of image data, wherein a piece of image data that is judged by the judging section not to meet any of the plurality of transmission criteria is printed by the print section.

9. The image processing device according to claim 1, further comprising a disposal section that disposes of a piece of image data, wherein a piece of image data that is judged by the judging section not to meet any of the plurality of transmission criteria is disposed of by the disposal section.

10. The image processing device according to claim 1, further comprising a second storage device, wherein a piece of image data that is judged by the judging section not to meet any of the plurality of transmission criteria is stored in the second storage device.

11. The image processing device according to claim 1, further comprising a transmission destination entering section that accepts a user's entry to designate a transmission destination and transmits a piece of image data to the designated transmission destination when the piece of image data does not meet any one of the plurality of transmission criteria.

12. The image processing device according to claim 1, further comprising a transmission destination changing section that accepts a user's entry to change a transmission destination and transmits a piece of image data to the changed transmission destination even when the piece of image data meets any one of the plurality of transmission criteria.

13. The image processing device according to claim 1, wherein the transmission section is configured to transmit the one or more pieces of image data with one of a plurality of transmission methods.

14. The image processing device according to claim 1, wherein the transmission section performs one of data coding, data compression and conversion to a file to be attached to an email depending upon a transmission method employed for transmission of the one or more piece of image data.

* * * * *